L. W. DAVIS.
GASOLENE TANK FILLER.
APPLICATION FILED OCT. 7, 1916.

1,274,517.

Patented Aug. 6, 1918.

Inventor:
Lawrence W. Davis,
by Roberts, Roberts & Culleman
Attorneys.

UNITED STATES PATENT OFFICE.

LAURENCE W. DAVIS, OF VEGA ALTA, PORTO RICO.

GASOLENE-TANK FILLER.

1,274,517.   Specification of Letters Patent.   Patented Aug. 6, 1918.

Application filed October 7, 1916.  Serial No. 124,237.

*To all whom it may concern:*

Be it known that I, LAURENCE W. DAVIS, a citizen of the United States, and resident of Vega Alta, Porto Rico, have invented new and useful Improvements in Gasolene-Tank Fillers, of which the following is a specification.

Gasolene tanks located under the front seats of motor vehicles are usually filled directly through the top of the tank. The filler opening on the top of the tank is in an inaccessible and awkward place, and in order to reach it the occupants of the seat must get out of the vehicle, the seat cushion must be removed and afterward replaced, and frequently articles stowed in the front seat must also be removed.

The principal object of this invention is to provide a readily accessible filler device, through which the tank may be filled without incommoding the occupants of the seat, or raising the seat cushion, or disturbing anything.

While the invention is applicable to cars of any kind in which the gasolene tank is situated under the seat, it is particularly designed for the gasolene tanks of Ford automobiles and will for convenience be illustrated as embodied in such automobiles.

In the accompanying drawings which illustrate the invention in its preferred form,—

Figure 2:
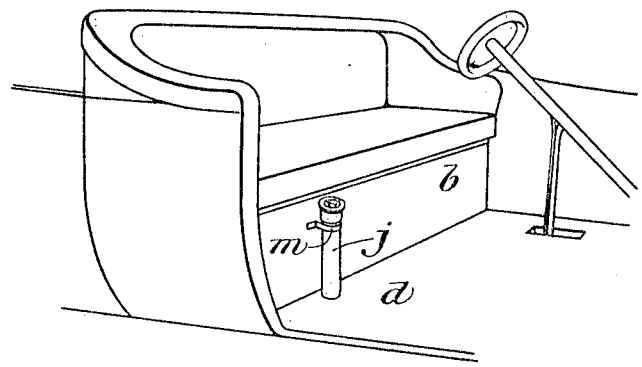
Figure 1:
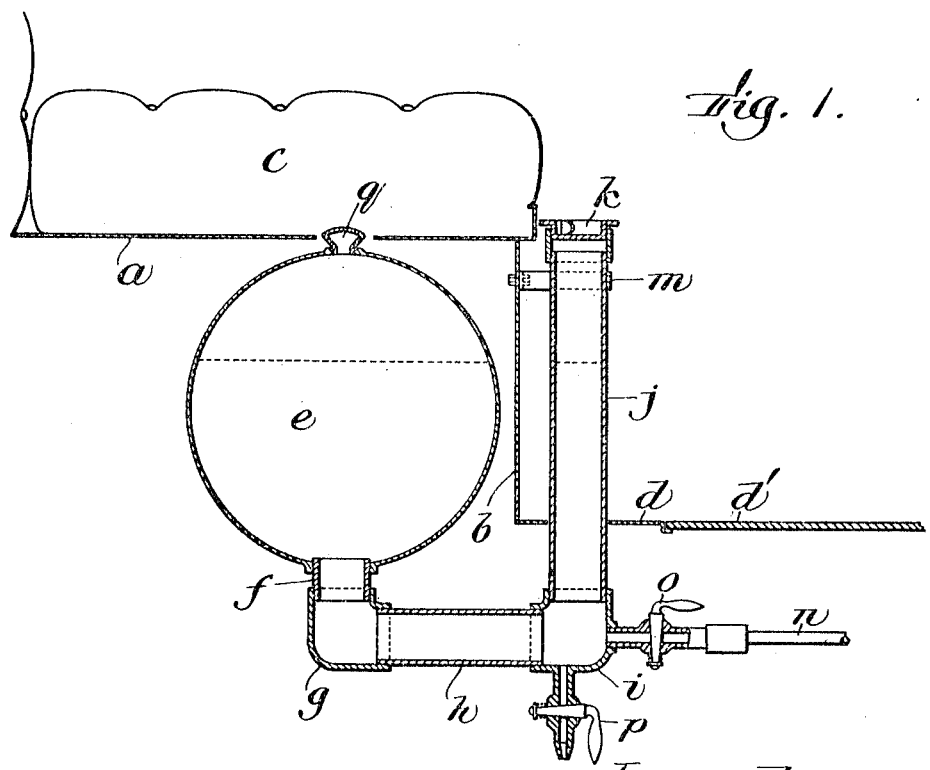

Figure 1 is a sectional view of the device, partly in elevation, and of associated parts of the car having to do with the invention; and Fig. 2 is a perspective view showing the position of the filler pipe.

The seat casing comprises the usual top $a$ and front wall $b$, and supports the usual seat cushion $c$. $d$ represents the floor which is provided with the usual movable floor board $d'$ to afford access to the parts below the floor.

Within the seat casing is the gasolene tank $e$ which has its inlet port through a nipple $f$ at the bottom of the tank. An elbow $g$ is secured to the nipple $f$ and a laterally extending pipe $h$ is secured to the elbow $g$. At the forward end of the pipe $h$ is another elbow $i$ from which rises the pipe $j$, the intake end of which is at least as high as the top of the tank $e$. The intake end of the pipe $j$ may be closed with a removable cap $k$. The parts $f$, $g$, $h$, $i$ and $j$ together constitute a filler pipe leading into the bottom of the tank within the seat casing but extending forwardly below the floor $d$, and upwardly through the floor outside of the seat casing, in a position in front of the seat where its intake end is readily accessible for filling the tank without disturbing the seat cushion or the occupants of the seat. A strap $m$ embracing the pipe $j$ and screwed or bolted to the front wall $b$ of the seat casing holds the pipe securely in upright position.

A pipe connection $n$ to the carbureter leads from the forward end of the horizontally extending filler pipe, and is controlled by a cut-off valve $o$ secured to the elbow $i$. At the bottom of the elbow $i$ is a drain cock $p$ through which the gasolene may be drawn off or sediment removed. Thus, both the drain cock and the cut-off valve are located under the floor and may be reached by merely removing the floor board instead of crawling underneath the car as usually necessary.

In order to equip the ordinary gasolene tank with my device it is only necessary to invert the usual gas tank top for bottom to bring the inlet port to the bottom, substitute a breather cap $q$ in place of the usual sediment bulb, attach the filler pipe, as shown, to the inlet port which has now been brought to the bottom of the tank, and connect the carbureter pipe to the nipple of the cut-off valve. A gasolene gage of any desired form may, if desired, be mounted in the filler opening at the top of pipe $j$.

With the construction above described the filler opening, the cut-off valve, and the drain cock are all perfectly accessible, and wholly eliminate the awkward and vexatious features of those parts as heretofore constructed.

Owing to the unique organization of the parts of my improved system and particularly by virtue of the direct communication from the upright pipe $j$ to both the tank $e$ and carbureter pipe $n$, gasolene may be supplied through pipe $j$ directly to either the tank $e$ or to the carbureter and engine. Thus the filler pipe $j$ may not only be employed to fill the tank $e$ but it may also be employed to supply gasolene directly to the carbureter as in an emergency, and owing to the fact that the carbureter pipe $n$, communicates with the bottom of pipe $j$ at coupling $i$ a small amount of gasolene can be employed substantially to the last drop. For example, should the tank $e$ become empty and only a small can of gasolene be available it could be poured into pipe $h$ and be used in toto to bring the automobile to a supply station. In this way the filler pipe $j$ serves a double purpose, viz., as a normal tank filler and as an emergency carbureter feeder.

I claim:

1. In liquid fuel apparatus of the character described, the combination of a fuel tank, a carbureter, connection communicating with the lower portion of the fuel tank for conducting the liquid fuel from the fuel tank to the carbureter, and means associated with the said connection for filling the fuel tank and for supplying fuel directly to the carbureter therethrough.

2. In liquid fuel apparatus of the character described, the combination of a fuel tank, a carbureter, connection communicating with the lower portion of the fuel tank for conducting the liquid fuel from the fuel tank to the carbureter, and a filler pipe communicating with said connection and extending upwardly at least to the level of the top of the fuel tank so that the fuel tank may be filled through said connection and so that fuel may be supplied directly to the carbureter through said filler pipe and connection.

3. In liquid fuel apparatus of the character described, the combination of a seat casing and floor for a motor vehicle, and a gasolene tank within the seat casing, a filler pipe connected to the bottom of said tank and thence extending laterally and upwardly through the floor at the outside of the seat casing and having its intake end at least as high as the top of the tank, and a carbureter pipe connection leading from the laterally extending part of the filler pipe under the floor.

4. The combination with the seat casing and floor of a motor vehicle, of a gasolene tank within the seat casing, a filler pipe connected to the bottom of said tank and thence extending laterally and upwardly through the floor at the outside of the seat casing and having its intake end at least as high as the top of the tank, and a carbureter pipe connection leading from the forward end of the horizontally extending part of the filler pipe under the floor.

Signed by me at San Juan, P. R., this 29th day of September, 1916.

LAURENCE W. DAVIS.

Witnesses:
JULES REMENEZ,
RAMION SIACA, Jr.

Copies of this patent may be obtained for five cents each, by addressing the "Commissioner of Patents, Washington, D. C."